United States Patent
Olds et al.

(10) Patent No.: US 7,310,707 B2
(45) Date of Patent: Dec. 18, 2007

(54) ADAPTIVE RESOURCE CONTROLLED WRITE-BACK AGING FOR A DATA STORAGE DEVICE

(75) Inventors: Edwin S. Olds, Oklahoma, OK (US); Travis D. Fox, Edmond, OK (US); Mark A Thiessen, Mustang, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 490 days.

(21) Appl. No.: 10/439,266

(22) Filed: May 15, 2003

(65) Prior Publication Data

US 2004/0230746 A1 Nov. 18, 2004

(51) Int. Cl.
*G06F 12/12* (2006.01)

(52) U.S. Cl. .......................... 711/133; 711/113; 710/56
(58) Field of Classification Search ................ 711/133, 711/134, 136, 159, 160, 113; 710/56
See application file for complete search history.

(56) References Cited

U.S. PATENT DOCUMENTS

| | | | | |
|---|---|---|---|---|
| 5,043,885 | A * | 8/1991 | Robinson | 711/133 |
| 5,432,989 | A | 7/1995 | Turek | |
| 5,787,473 | A * | 7/1998 | Vishlitzky et al. | 711/134 |
| 6,237,046 | B1 | 5/2001 | Ohmura | |
| 6,292,880 | B1 | 9/2001 | Mattis | |
| 6,389,509 | B1 | 5/2002 | Berenguel | |
| 6,408,357 | B1 | 6/2002 | Hanmann | |
| 6,460,122 | B1 | 10/2002 | Otterness | |
| 6,516,426 | B1 | 2/2003 | Forehand | |
| 6,542,968 | B1 | 4/2003 | Spencer | |
| 6,594,742 | B1 * | 7/2003 | Ezra | 711/159 |
| 6,671,766 | B1 * | 12/2003 | Vandenbergh et al. | 711/134 |
| 6,738,865 | B1 * | 5/2004 | Burton et al. | 711/133 |
| 6,789,163 | B2 | 9/2004 | Fox et al. | |
| 6,868,439 | B2 * | 3/2005 | Basu et al. | 709/213 |
| 6,961,822 | B2 * | 11/2005 | Rozario et al. | 711/133 |
| 6,978,325 | B2 * | 12/2005 | Gibble et al. | 710/33 |
| 6,996,676 | B2 * | 2/2006 | Megiddo et al. | 711/129 |
| 2002/0029354 | A1 | 3/2002 | Forehand | |
| 2002/0078303 | A1 * | 6/2002 | Rozario et al. | 711/133 |
| 2002/0091901 | A1 * | 7/2002 | Romm | 711/133 |
| 2003/0070065 | A1 | 4/2003 | Fleming | |
| 2003/0212865 | A1 * | 11/2003 | Hicken et al. | 711/135 |
| 2004/0024971 | A1 * | 2/2004 | Bogin et al. | 711/135 |
| 2004/0205297 | A1 * | 10/2004 | Bearden | 711/133 |

\* cited by examiner

*Primary Examiner*—Donald Sparks
*Assistant Examiner*—Jared I Rutz
(74) *Attorney, Agent, or Firm*—Fellers, Snider, et al.

(57) ABSTRACT

A method for determining an aging period for retaining a write-back data in a cache memory prior to writing the write-back data to a storage media is determined through use of a write-back aging routine. The aging period is based on a proportional utilization level of the cache memory by the write-back data, the higher the memory utilization level, the shorter the period for aging the write-back data. The aging period takes a form of an aging threshold, which differs depending on the memory utilization level, i.e., the amount of cache memory utilized by the write-back data.

The method includes, identifying the memory utilization level, selecting the data aging threshold based on the memory utilization level; and writing the data from the cache memory to the storage media when an age of the data in the memory exceeds the selected data aging threshold.

30 Claims, 3 Drawing Sheets

| | | |
|---|---|---|
| READ DATA - 1 | WRITE DATA - A | |
| READ DATA - 2 | WRITE DATA - B | |
| READ DATA - 3 | WRITE DATA - C | |
| READ DATA - 4 | WRITE DATA - D | |
| READ DATA - 5 | WRITE DATA - E | |
| READ DATA - 6 | WRITE DATA - F | |
| READ DATA - 7 | WRITE DATA - G | |
| READ DATA - 8 | WRITE DATA - H | |
| READ DATA - X | WRITE DATA - ZZ | |
| READ DATA - X1 | | |
| READ DATA - XX | | | ns
ADAPTIVE RESOURCE CONTROLLED WRITE-BACK AGING FOR A DATA STORAGE DEVICE

FIELD OF THE INVENTION

This invention relates generally to the field of magnetic data storage devices, and more particularly, but not by way of limitation, to adaptively controlling write-back aging based on memory resource utilization for a data storage device.

BACKGROUND

Data storage devices (DSD) store data and include a mechanical portion, or head-disc assembly (HDA) and an electronics portion, or printed circuit board wiring assembly (PWA), controlling functions of the HDA while providing a communication interface between the HDA and a host being serviced by the DSD.

The HDA has a disc, with data recorded on a recording surface, rotated at a constant speed by a motor assembly, the data is accessed by a read/write head of an actuator assembly positionably controlled by a closed loop servo system.

The data storage device market continues to place pressure on the industry for DSD's with higher rates of data throughput. Reading and storing data beyond requested data in a cache may satisfy future host read requests, thereby eliminating the need for mechanical access. This process of reading and storing additional information is known as reading speculative read data. Improving accuracy of speculative data acquisition would advantageously improve data throughput.

As such, challenges remain and needs persist for improved speculative data acquisitions methods.

SUMMARY OF THE INVENTION

In accordance with preferred embodiments, a method for determining an aging period for retaining a write-back data in a cache memory prior to writing the write-back data to a storage media is determined through use of a write-back aging routine, to improve throughput performance of a data storage device.

The method includes, identifying a plurality of memory utilization limit levels for the plurality of data of the memory; associating a data aging threshold for each of the plurality of memory utilization limit levels based on a predetermined portion of the memory used by the data; writing a first data of the plurality of data to a storage media when an age of the first data exceeds the data aging threshold associated with a first of the plurality of utilization limit levels; determining a portion of the memory utilized by data of the plurality of data remaining in the memory is below a second of the plurality of utilization limit levels; and writing a second data of the plurality of data remaining in the memory to the storage media when an age of the second data exceeds the data aging threshold associated with the second of the plurality of utilization limit levels.

These and various other features and advantages that characterize the claimed invention will be apparent upon reading the following detailed description and upon review of the associated drawings.

DETAILED DESCRIPTION

Figures 1, 3:
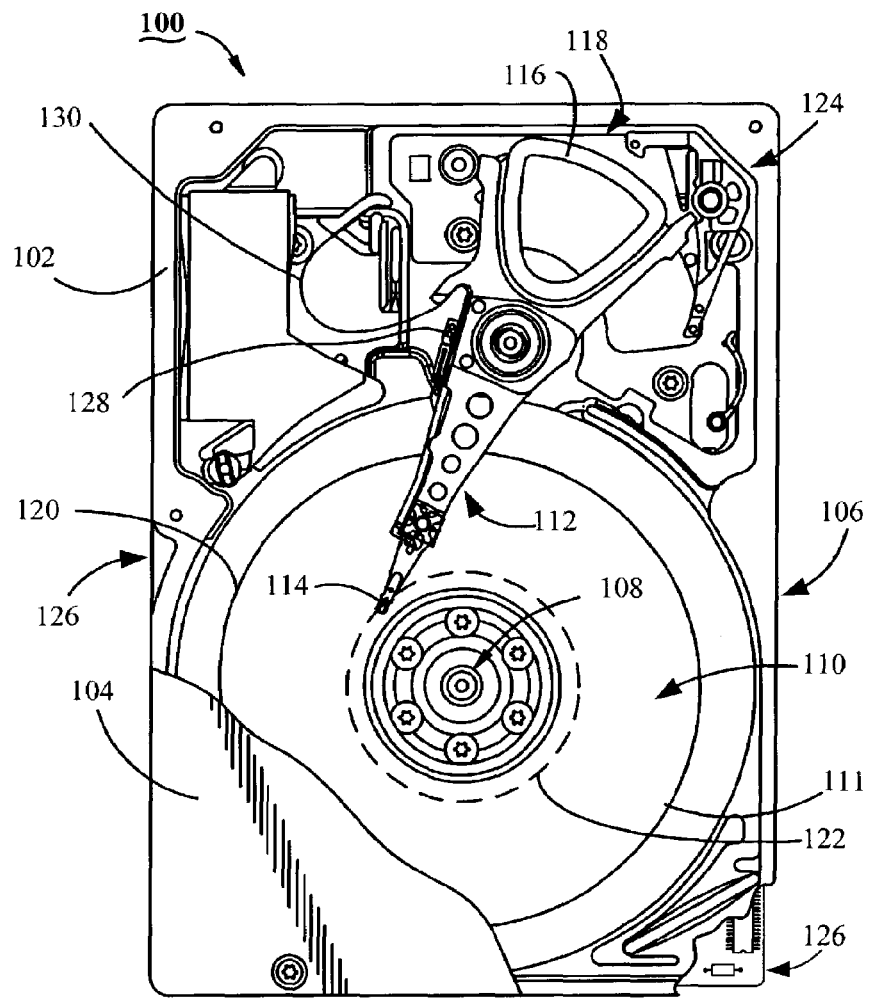
FIG. 1 is a top plan view of a data storage device constructed and operated in accordance with preferred embodiments of the present invention.
FIG. 3 is a tabular representation of write data and read data in a cache memory of the circuit of FIG. 2.

Referring now to the drawings, FIG. 1 provides a top plan view of a data storage device 100 (also referred to as DSD 100). The DSD 100 includes a rigid base deck 102 cooperating with a top cover 104 (shown in partial cutaway) to form a sealed housing for a mechanical portion of the DSD 100, typically referred to as a head-disc assembly 106. A spindle motor assembly 108 (also referred to as motor 108) rotates a number of data storage discs 110 with a magnetic recording surface 111 (also referred to as storage media 111) at a substantially constant speed. A rotary actuator 112 (also referred to as actuator 112) supports and rotates a number of read/write heads 114 adjacent the storage media 111 when current is applied to a coil 116 of a voice coil motor (VCM) 118.

During operation of the DSD 100, the actuator 112 moves the heads 114 to information data tracks 120 of the storage media 111 to write data to and read data from the disc 110. When the DSD 100 is deactivated, the actuator 112 positions the heads 114 adjacent a home position 122 and the actuator 112 is confined by latching a toggle latch 124.

Command, control and interface electronics for the DSD 100, are provided on a printed circuit board assembly 126 mounted to the head-disc assembly 106. Operational control of the data storage device is provided by firmware executed by a micro-processor controller (not separately shown) of the printed circuit board assembly 126. During data transfer operations, a preamplifier/driver (preamp) 128 attached to a flex circuit 130, conditions read/write signals conducted by the flex circuit 130 between the printed circuit board assembly 126 and the read/write head 114.

Figure 2:
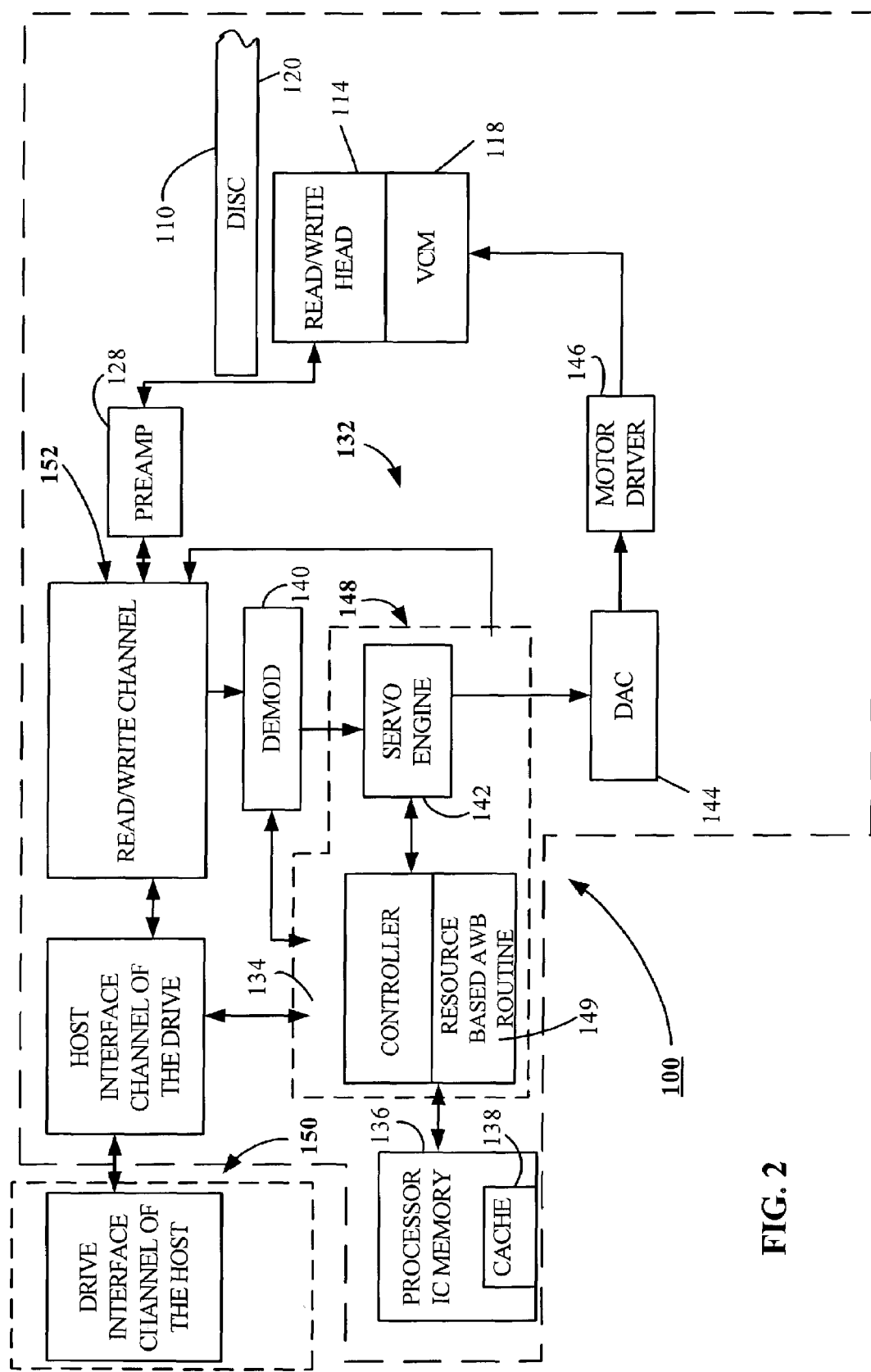
FIG. 2 is a functional block diagram of a circuit for controlling operation of the data storage device of FIG. 1, the circuit programmed with a resource based write-back aging (AWB) routine.

Turning to FIG. 2, position-controlling of the read/write head 114 is provided by the positioning mechanism (not separately shown) operating under the control of a servo control circuit 132 programmed with servo control code, which forms a servo control loop.

The servo control circuit 132 includes a micro-processor controller 134 (also referred to herein as controller 134), a memory 136, a cache memory 138, a demodulator (DE-MOD) 140, an application specific integrated circuit (ASIC) hardware-based servo controller ("servo engine") 142, a digital to analog converter (DAC) 144 and a motor driver circuit 146. Optionally, the controller 134, the random access memory 136, and the servo engine 142 are portions of an application specific integrated circuit 148.

The components of the servo control circuit 132 are utilized to facilitate track following algorithms for the actuator 112 (of FIG. 1) and more specifically for controlling the voice coil motor 118 in position-controlling the read/write head 114 relative to the selected information track 120.

In addition to the servo control code programmed into an application specific integrated circuit 148, the control code is also programmed into the application specific integrated circuit 148 for use in executing and controlling data transfer functions between a host 150 and the DSD 100. Data received from the host 150 is placed in the cache memory 138 for transfer to the disc 110 by read/write channel electronics 152, which operates under control of the controller 134. Read data requested by the host 150, not found in cache memory 138, are read by the read/write head 114 from the information track 120, and then processed by the read/write channel electronics (channel) 152 and stored in the cache memory 138 for subsequent transfer to the host 150.

A portion of the random access memory 136 is used as a cache memory 138 for storage of data read from the information track 120 (of FIG. 1) awaiting transfer to a host connected to the DSD 100. The cache memory is also used for write-back cache, storage of data transferred from the host to the DSD 100 to be written to the information track 120. The information track 120 is divided into a plurality of data-sectors of fixed length, for example, 512 bytes.

Similarly, the cache memory 138 portion of the random access memory 136 is sectioned into a plurality of data blocks of either fixed length, sometimes referred to as segments, or variable length, sometimes referred to as fragments. Each fixed length data block is substantially sized to accommodate one of the plurality of fixed length data-sectors of the information track 120. For example, under a buffer memory or cache management scheme, the plurality of data blocks are grouped into a plurality of fixed length memory segments within an 8 MB cache memory.

As cache memory is needed to store data read from the disc 110, segments are assigned via pointers in the control code. Once a segment has been assigned, that portion of the cache memory is consumed in its entirety. Cache memory is also used for storing commands associated with an execution queue, as well as for storage of various operational needs of the DSD 100 as discussed further herein below.

Because allocation of the amount of memory (of the memory 136) dedicated to cache memory 138 is limited, effective utilization of the cache memory 138 is important to the overall operating performance of the DSD 100. To maximize the effective utilization of the cache memory 138, non-requested data (i.e., speculative data [data having a future probability of being requested by the host 150]) in addition to host data (i.e., the data requested by the host 150) is frequently retrieved from the disc 110 during a seek operation and placed in the cache memory 138.

Speculative data portion may include data preceding the host data portion (read on arrival data) and data subsequent to the host data portion (read look ahead data).

Speculative data is gathered and stored in the cache memory 138 in an attempt to avoid a future mechanical seek to the disc 110 for data requested by the host 150. By satisfying a request for data from the host 150 out of the cache memory 138, use of the mechanical components of the DSD 100 is avoided, thereby increasing data transfer performance by the DSD 100.

Keeping in mind the limited storage space made available for the cache memory 138, and to maximize avoidance of the use of the mechanical components of the DSD 100 for servicing a request for data by the host 150, the present invention utilizes a resource based write-back aging (AWB) routine 149.

The AWB routine 149 improves the utility of the cache memory 138 and the operational efficiency of the DSD 100. In a preferred embodiment, when a write command is received by the DSD 100 from the host 150, the DSD 100 will store the write command in the cache memory 138, as write-back data, which will be written to the disc 110 at a future time. The cache memory 138 provides a throughput performance advantage by reporting to the host 150 a command completed once the data has been validated and received into cache memory 138. Writing the data to the disc is typically a much longer process than a host data transfer and by deferring the data write operation until a time selected by the DSD 100 (a time in which the host 150 is not requesting service by the DSD 100), the write time is hidden from the host 150 and does not impact throughput performance.

To enhance understanding of the present invention, the term dirty data (DD) is used herein to denote write data stored in the cache memory 138 awaiting transfer to the disc 110. The consumption of memory within the cache memory 138 by DD represents a very different situation than the consumption of memory within the cache memory 138 by read data (i.e., clean data [CD]). A portion of the cache memory 138 consumed by CD can be continuously reused by new read commands. The portion of the cache memory 138 consumed by DD cannot be reused until that data has been written to the disc 110.

While it is important that DD be written to the disc in a timely manner (in order to free memory of the cache memory 138 for storage of future commands) a benefit to an enhanced throughput performance has been found by setting an aging limit for the DD residing in the cache memory 138. The aging limit is set to facilitate retention in the cache memory 138 for a certain amount of time before the DD is considered a candidate for a disc access and subsequent write-back.

Improvements in throughput performance are gained through the use of such an agent by increasing the probability of coalescing data from multiple commands into fewer disc accesses as well as reducing the amount of cache memory 138 that is recycled in a short period of time.

To illustrate a benefit of incorporating aging DD prior to write-back to the disc 110, two examples are provided. The first example considers a scenario with no DD write-back aging in place, while the second example contrasts the first example by presenting a scenario with DD write-back aging in place. Under the first scenario:

1. No DD occupies the cache memory 138 (i.e., there is no DD at this time requiring a write operation to the disc 110).
2. The host 150 issues a 16-block write command starting at a logical block address (LBA) 1000.
3. The DSD 100 stores these 16 blocks of data in the cache memory 138 as DD in a structural form such as described hereinabove.
4. The DSD 100 returns a command complete to the host 150.
5. Without write-back aging in place (and since there are no other commands needing access to the disc 110) the DSD starts a write-back of the DD to the disc 110.
6. During execution of the write-back, the host 150 issues a read command, which is unsatisfied by data resident in the cache memory 138 (i.e., the data requested does not result in a cache hit). Therefore, the read command has to wait until the completion of the write-back of the DD before being given access to the disc 110.
7. Following completion of execution of the read command, the host 150 issues a second 16-block write command to start at LBA 1008. Note that the second 16-block write command overlaps the first 16-block write command. If the first 16-block write command had not been previously executed, the first and second 16-block write commands could be combined, thus saving the disc access. Rather, the DSD 100 continues operation by executing the write-back of the DD to the disc 110.

Under the second scenario:
1. Again, no DD occupies the cache memory 138.
2. The host 150 issues a first 16-block write command starting at a logical block address (LBA) 1000.
3. The DSD 100 stores these 16 blocks of data as DD in the cache memory 138.
4. The DSD 100 returns a command complete to the host 150.
5. An aging limit is assigned to the DD stored in the cache memory 138.
6. Prior to expiration of the aging limit, the host 150 requests data by issuing a read command that is not a cache hit. The read command is given access to the disc 110 for retrieval of the requested data.
7. Upon completion of the read command, the host 150 issues a second 16-block write command beginning at LBA 1008. Note that the second 16-block write command overlaps the first 16-block write command. Because of this overlap and because a delay in executing a write back is in use, the first 16-block write command is combined with the second 16-block write command to form a single write-back, thereby saving the disc access, which improves throughput performance of the DSD 100.

In another scenario, which illustrates the benefits of incorporating an AWB routine, a read request from the host 150 is satisfied from the DD stored in the cache memory 138. Under the third scenario:
1. Several write commands are issued by the host 150, which are stored as DD in the cache memory by the DSD 100, a command complete is issued to the host 150, and each of the DD begin approaching their aging limit.
2. A request for data issued by the host 150 and received by the DSD 100, which is not in the speculative data portion of the cache memory 138, overlaps with one of the several prior write commands.
3. Because of write-back aging, a cache hit (service from the DD) results thereby eliminating the need for a disc access.

The above scenarios have been illustrations of write-back aging, (i.e., retaining DD in the cache memory 138 for a predetermined period of time prior to writing the DD to the disc 110) using a set or static aging limit. The present invention incorporates a dynamic aging limit as opposed to the static limit of the above illustrations.

In a preferred embodiment, a method for determining an aging period for retaining the DD in the cache memory (such as 138) prior to writing the DD as write-back data to a storage media (such as disc 110) is determined through use of a write-back aging routine (such as 149). The aging period, or data aging threshold, is based on a proportional utilization level of the cache memory by the DD (i.e. a memory utilization level), the higher the memory utilization level, the shorter the period of time allotted for the data aging threshold and the more quickly the DD is written to the storage media. In other words, rather than having a static predetermined data aging threshold, the data aging threshold differs depending on the memory utilization level of the cache memory 138 by the write-back data.

In a preferred embodiment, utilization limit levels are determined by the customer, associated with a data aging threshold, which are also selected by the customer and placed in a table. In an alternate preferred embodiment, a data aging threshold as a function of memory utilization formula is utilized, where the rate of change of the data aging threshold relative to the memory utilization level is a user defined value based on the environment of the DSD 100, the amount of memory 136 allocated to cache memory 138 and the application environment of the DSD 100. In either embodiment, tuning the DSD 100 to its operating environment may be accomplished in a multitude of ways to suit a particular use environment.

FIG. 3 illustrates a memory management scheme for managing the cache memory 138. Although not necessarily physically segregated within the cache memory 138, read data 154 are associated, prioritized and maintained in a manner to heighten an opportunity of servicing a request from a host 150 (of FIG. 2), while write data (DD) 156 are held in an association with one another, according to a period of time each of the individual DD fragments have persisted in the cache memory 138.

The present invention contemplates grouping the individual DD fragments into groups of data that may be written to a storage media (such as disc 110), using a minimum number of disc accesses. When such data groupings are present, the individual DD having persisted in the cache memory 138 for the longest period of time is compared to the data aging threshold for determination of writing the data group to the storage media.

Figure 4:
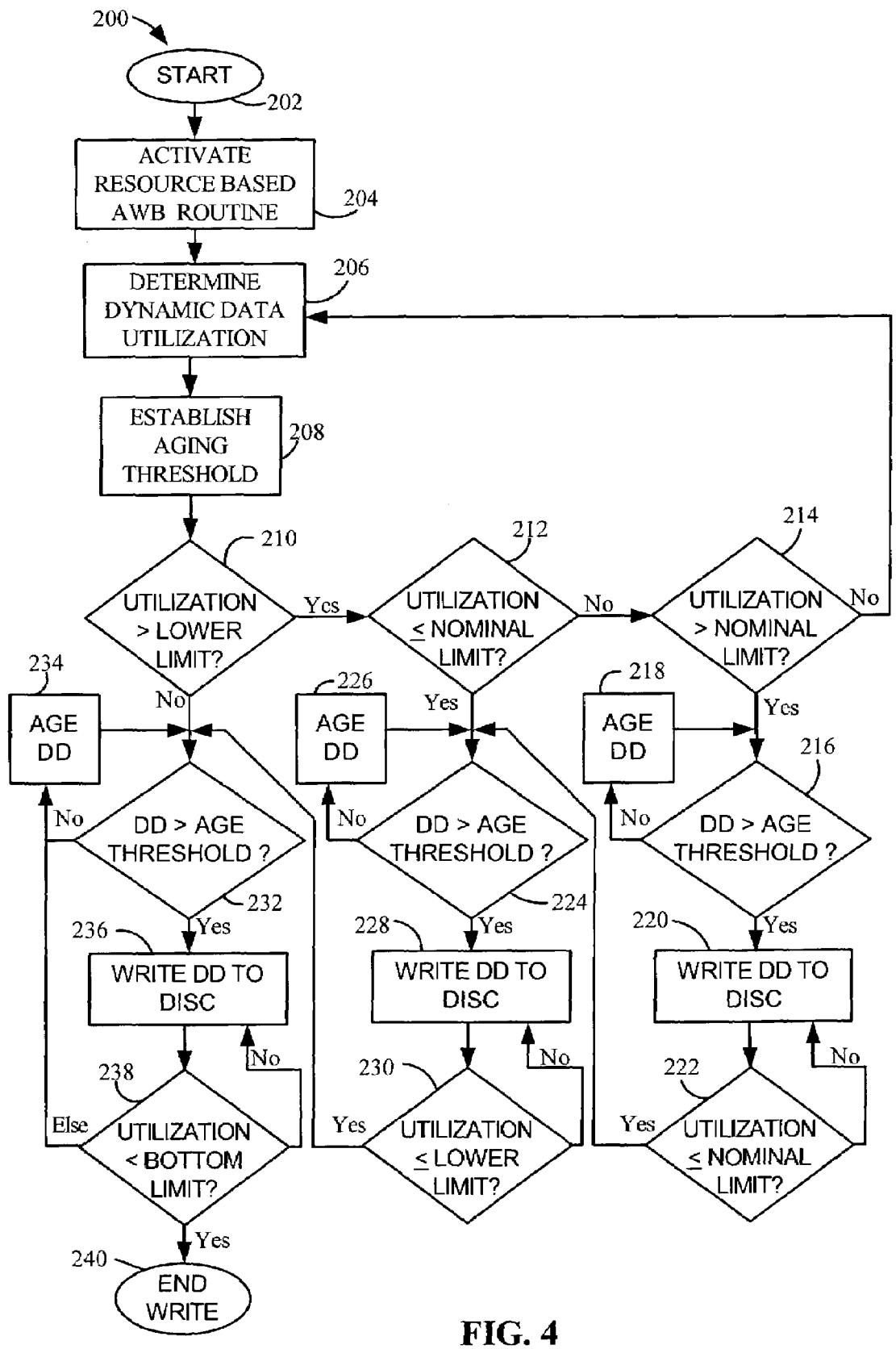
FIG. 4 is a flowchart of an embodiment of the AWB routine of FIG. 2.

To enhance an understanding of a preferred embodiment, but not by way of imposing limitations on the present invention, an overview of a preferred embodiment of a use for the present invention is disclosed with reference to FIG. 4. This particular use embodiment is for illustrative purposes only, does not restrict use, impose or inherently impose limitations on use of the present invention, nor does it encompass all use combinations. The values used within and throughout the description of FIG. 4 are exemplary and are not to be read as limitations of the present invention, but rather may be viewed as a best mode for implementing a preferred embodiment.

FIG. 4 shows a flowchart of steps of the AWB routine 149. Upon starting a write-back operation, a controller (such as 134) executes a write-back aging process 200, shown by FIG. 4, beginning with start process step 202 and continuing with process step 204 with activation of a resource based write-back aging routine (such as AWB routine 149). At process step 206, a determination is dynamically made regarding what portion of a memory (such as cache memory 138) is being utilized for storing DD (such as 156). Based on the portion of the memory being utilized for storing DD, the write-back aging process 200 establishes an appropriate data aging threshold at process step 208.

In a preferred embodiment, three data aging threshold values are selected for use, based on the level of utilization of memory by the DD. If the utilization of the memory is below 40 percent, the write-back aging process 200 determines the utilization of the memory by the DD to be below a lower utilization limit level as shown by process step 210. If the utilization of the memory is below 60 percent, the write-back aging process 200 determines the utilization of the memory by the DD to be a nominal utilization limit level as shown by process step 212. If the utilization of the memory is above 60 percent, the write-back aging process 200 determines the utilization of the memory by the DD to be above the nominal utilization limit level as shown by process step 214.

For the lower utilization limit level, an aging period of 36 milliseconds is selected as the data aging threshold. For the nominal utilization limit level, an aging period of 12 milliseconds is selected as the data aging threshold, and for the above nominal utilization, an aging period of one millisecond is selected as the data aging threshold. In the preferred embodiment, the relationship between the utilization limit levels and their associated data aging thresholds are maintained in a table loaded into the controller upon initialization of a DSD (such as 100).

At process step 210, if the utilization limit level is greater than the lower limit level, the write-back aging process 200 proceeds to process step 212. At process step 212, if the utilization limit level is not less than or equal to the nominal utilization limit level, the write-back aging process 200 proceeds to process step 214. If, while determining an appropriate data aging threshold to be applied to the DD resident in the memory, the AWB routine is interrupted or intervening cache hits have changed the proportional utilization of the memory, the write-back aging process 200 reverts to process step 206 with a re-evaluation of the utilization of the memory by the DD, and proceeds with an execution of the AWB routine.

However, if a change in the utilization limit level has not occurred at process step 214, the write-back aging process 200 proceeds to process step 216. At process step 216, an age of the DD is compared to the data aging threshold associated with the above nominal utilization limit level. If the age of the DD is less than the data aging threshold associated with the above nominal utilization limit level, the write-back aging process 200 proceeds to process step 218, where the DD continues to age until such time that the age of the DD is greater than the data aging threshold associated with the above nominal utilization limit level. When the age of the DD is greater than the data aging threshold associated with the above nominal utilization limit level, the write-back aging process 200 proceeds to process step 220.

At process step 220, the DD is substantially sequentially written to the storage media. At process step 222, a determination is made whether or not writing the DD to the storage media has reduced the utilization of the memory to a level less than or equal to the nominal utilization limit level. If the utilization of the memory has not been reduced to a level lower than or equal to the nominal utilization limit level, the write-back aging process 200 reverts to process step 220 and continues writing additional DD to the storage media until the utilization of the memory has been reduced to a level lower than or equal to the nominal utilization limit level. When the utilization level of the memory has been reduced to a level lower than or equal to the nominal utilization level, the write-back aging process 200 proceeds to process step 224.

At process step 224, an age of the DD is compared to the data aging threshold associated with the nominal utilization limit level. If the age of the DD is less than the data aging threshold associated with the nominal utilization limit level, the write-back aging process 200 proceeds to process step 226, where the DD continues to age until such time that the age of the DD is greater than the data aging threshold associated with the nominal utilization limit level. When the age of the DD is greater than the data aging threshold associated with the nominal utilization limit level, the write-back aging process 200 proceeds to process step 228.

At process step 228, the DD is substantially sequentially written to the storage media. At process step 230, a determination is made whether or not writing the DD to the storage media has reduced the utilization of the memory to a level less than or equal to the lower utilization limit level. If the utilization of the memory has not been reduced to a level lower than or equal to the nominal utilization limit level, the write-back aging process 200 reverts to process step 228 and continues writing additional DD to the storage media until the utilization of the memory has been reduced to a level lower than or equal to the lower utilization limit level. When the utilization level of the memory has been reduced to a level lower than or equal to the lower utilization level, the write-back aging process 200 proceeds to process step 232.

At process step 232, an age of the DD is compared to the data aging threshold associated with the lower utilization limit level. If the age of the DD is less than the data aging threshold associated with the lower utilization limit level, the write-back aging process 200 proceeds to process step 234, where the DD continues to age until such time that the age of the DD is greater than the data aging threshold associated with the lower utilization limit level. When the age of the DD is greater than the data aging threshold associated with the lower utilization limit level, the write-back aging process 200 proceeds to process step 236.

At process step 236, the DD is substantially sequentially written to the storage media. At process step 238, a determination is made whether or not writing the DD to the storage media has reduced the utilization of the memory to a level less than or equal to a bottom utilization limit level. The bottom utilization limit level incorporates both the proportional amount of memory utilized by DD, and the age of the DD utilizing the memory. If the utilization of the memory has not been reduced to a level lower than or equal to the bottom utilization limit level, the write-back aging process 200 reverts to process step 236 and continues writing additional DD to the storage media until the utilization of the memory has been reduced to a level lower than or equal to the bottom utilization limit level. When no DD remains in the memory, the write-back aging process 200 proceeds to end write process step 240, else the write-back process 200 reverts to process step 234, when DD remains and the aging of the DD is less than the data aging threshold associated with the lower utilization limit level and continues with execution of process steps 232 through 240.

Accordingly, embodiments of the present invention are generally directed to a method of transferring data from a memory (such as 138) to a storage media (such as 111 of disc 110) by executing steps of a process (such as 200), which includes, identifying a level of the memory utilized by the data (such as by step 206); selecting a data aging threshold (such as by step 208) based on the level of memory utilization (i.e. a memory utilization level); and writing the data from the memory to the storage media when an age of the data in the memory exceeds the selected data aging threshold.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed in the appended claims.

What is claimed is:

1. A method comprising:
    selecting a data aging threshold based on a utilization level of a memory less than a full utilization thereof; and
    transferring data from the memory to a storage media when an age of the data in the memory, expressed as an overall elapsed time interval, exceeds the selected data aging threshold.

2. The method of claim 1, in which the memory utilization level is determined by steps comprising:
    determining a cache memory portion of the memory;
    ascertaining a portion of the cache memory occupied by the data;
    comparing the portion of the cache memory occupied by the data to the cache memory portion of memory; and
    identifying a level of the cache memory utilized by the data as the memory utilization level.

3. The method of claim 2, in which the data aging threshold is selected by steps comprising:
    referencing an aging limit threshold table associating the data aging threshold with the memory utilization level; and
    selecting the data aging threshold associated with the memory utilization level.

4. The method of claim 1, in which the data is a plurality of data segments, wherein an age of each of the plurality of data segments is compared to the selected data aging threshold.

5. The method of claim 4, in which each of the plurality of data segments exceeding the selected data aging threshold are written to the storage media.

6. The method of claim 4, in which a group of data segments are selected from the plurality of data segments based on an attribute of each member of the selected group, in which an oldest data segments of the group of selected data segments is compared to the selected data aging threshold, and the group of selected data segments are sequentially written to the media when the oldest data segments of the group of selected data segments exceeds the selected data aging threshold.

7. The method of claim 1, in which the memory utilization level is a lower limit level.

8. The method of claim 7, in which the lower limit level is a 40 percent utilization of the memory.

9. The method of claim 8, in which the aging threshold is a 36 millisecond threshold.

10. The method of claim 9, in which the memory is a cache memory.

11. The method of claim 1, in which the memory utilization level is a nominal limit level.

12. The method of claim 11, in which the nominal limit level is a 60 percent utilization of the memory.

13. The method of claim 12, in which the aging threshold is a 12 millisecond threshold.

14. The method of claim 13, in which the memory is a cache memory portion of the memory.

15. The method of claim 1, in which the memory utilization level is greater than a nominal limit level.

16. The method of claim 15, in which the aging threshold is a 1 millisecond threshold.

17. The method of claim 16, in which the memory is a cache memory portion of the memory.

18. A method comprising:
    identifying a plurality of memory utilization limit levels for data retained in a memory;
    associating a data aging threshold for each of the plurality of memory utilization limit levels based on a predetermined portion of the memory used by the data;
    transferring a first portion of the data to a storage media when an age of the first portion exceeds the data aging threshold associated with a first of the plurality of utilization limit levels; and
    transferring a second portion of the data to the storage media when an age of the second data exceeds the data aging threshold associated with the second of the plurality of utilization limit levels.

19. The method of claim 18, in which the memory is a cache memory.

20. A device comprising:
    a memory with a data segment; and
    a controller configured to select a data aging threshold based on a utilization level of the memory less than a full utilization thereof and expressed as a first overall elapsed time interval, and to transfer data from the memory to a storage media in relation to an age of the data segment, expressed as a second overall elapsed time interval during which the data segment persisted in the memory, and said threshold.

21. The device of claim 20, in which the memory includes a cache portion, the data segment residing in the cache portion and including a data content.

22. The device of claim 21, in which the memory includes an aging limit threshold table, and in which the cache portion has a memory capacity limit, the data segment is a plurality of data segments, and the data content of the data segment is a data content in each of the plurality of data segments.

23. The device of claim 22, in which the aging limit threshold table includes a predetermined memory utilization limit of the cache memory capacity and is associated with a predetermined aging threshold.

24. The device of claim 23, in which the predetermined memory utilization limit is a lower memory utilization limit, and in which the resource based write-back aging routine comprises a lower memory utilization limit determination portion which determines whether the data content exceeds the lower memory utilization limit.

25. The device of claim 23, in which the predetermined memory utilization limit is a nominal memory utilization limit, and in which the resource based write-back aging routine comprises a nominal memory utilization limit determination portion which determines whether the data content is within the nominal memory utilization limit.

26. The device of claim 23, in which the predetermined memory utilization limit is a memory utilization limit that exceeds a nominal memory utilization limit, and in which the resource based write-back aging routine comprises an exceeding a nominal memory utilization limit determination portion which determines whether the data content exceeds the nominal memory utilization limit.

27. The device of claim 24, in which the lower memory utilization limit is a 40 percent utilization of the cache memory capacity limit, and in which the predetermined aging threshold associated with the lower memory utilization limit is a 36 millisecond threshold.

28. The device of claim 25, in which the nominal memory utilization limit is a 60 percent utilization of the cache memory capacity limit, and in which the predetermined aging threshold associated with the nominal memory utilization limit is a 12 millisecond threshold.

29. The device of claim 26, in which the memory utilization limit that exceeds a nominal memory utilization limit is a utilization of the cache memory capacity limit that exceeds a 60 percent utilization of the cache memory capacity limit, and in which the predetermined aging threshold associated with the utilization of the cache memory capacity limit that exceeds the 60 percent utilization of the cache memory capacity limit is a 1 millisecond threshold.

30. A data storage device comprising:
   a cache memory;
   a storage medium communicating with the cache memory; and
   a controller programmed with a resource based write-hack aging routine configured to identify a memory utilization level for the cache memory less than 100 percent thereof to select a data aging threshold based on the memory utilization level as a first overall elapsed time interval, and transfer data from the memory to the storage medium when an age of the data in the memory, expressed as a second overall elapsed time interval, exceeds the selected data aging threshold.

* * * * *